(No Model.) 2 Sheets—Sheet 2.

H. GROSWITH.
ELECTRIC MOTOR OR GENERATOR.

No. 428,481. Patented May 20, 1890.

Witnesses:
F. L. Ourand
Wm. F. Folks

Inventor:
Henry Groswith
By his Attorneys

UNITED STATES PATENT OFFICE.

HENRY GROSWITH, OF PHILADELPHIA, PENNSYLVANIA, ASSIGNOR, BY DIRECT AND MESNE ASSIGNMENTS, OF PART TO CHARLES W. KENNEDY AND RANSOM F. RANKIN, BOTH OF SAME PLACE.

ELECTRIC MOTOR OR GENERATOR.

SPECIFICATION forming part of Letters Patent No. 428,481, dated May 20, 1890.

Application filed August 13, 1889. Serial No. 320,616. (No model.)

*To all whom it may concern:*

Be it known that I, HENRY GROSWITH, a citizen of the United States, and a resident of Philadelphia, in the county of Philadelphia and State of Pennsylvania, have invented certain new and useful Improvements in Electric Motors or Dynamos; and I do hereby declare that the following is a full, clear, and exact description of the invention, which will enable others skilled in the art to which it appertains to make and use the same, reference being had to the accompanying drawings, which form a part of this specification.

This invention relates to improvements in electric motors.

The object of the invention is to provide a motor of this class which shall be very speedy and effective in use and in which the direction of the electric currents can be almost instantaneously changed and the rotation of the armature reversed.

A motor constructed according to my invention is very simple and compact, and in practice will be found to possess advantages over similar motors now in common use.

The invention consists in the novel construction and combination of parts, hereinafter fully described, and specifically pointed out in the claims.

Figure 1:
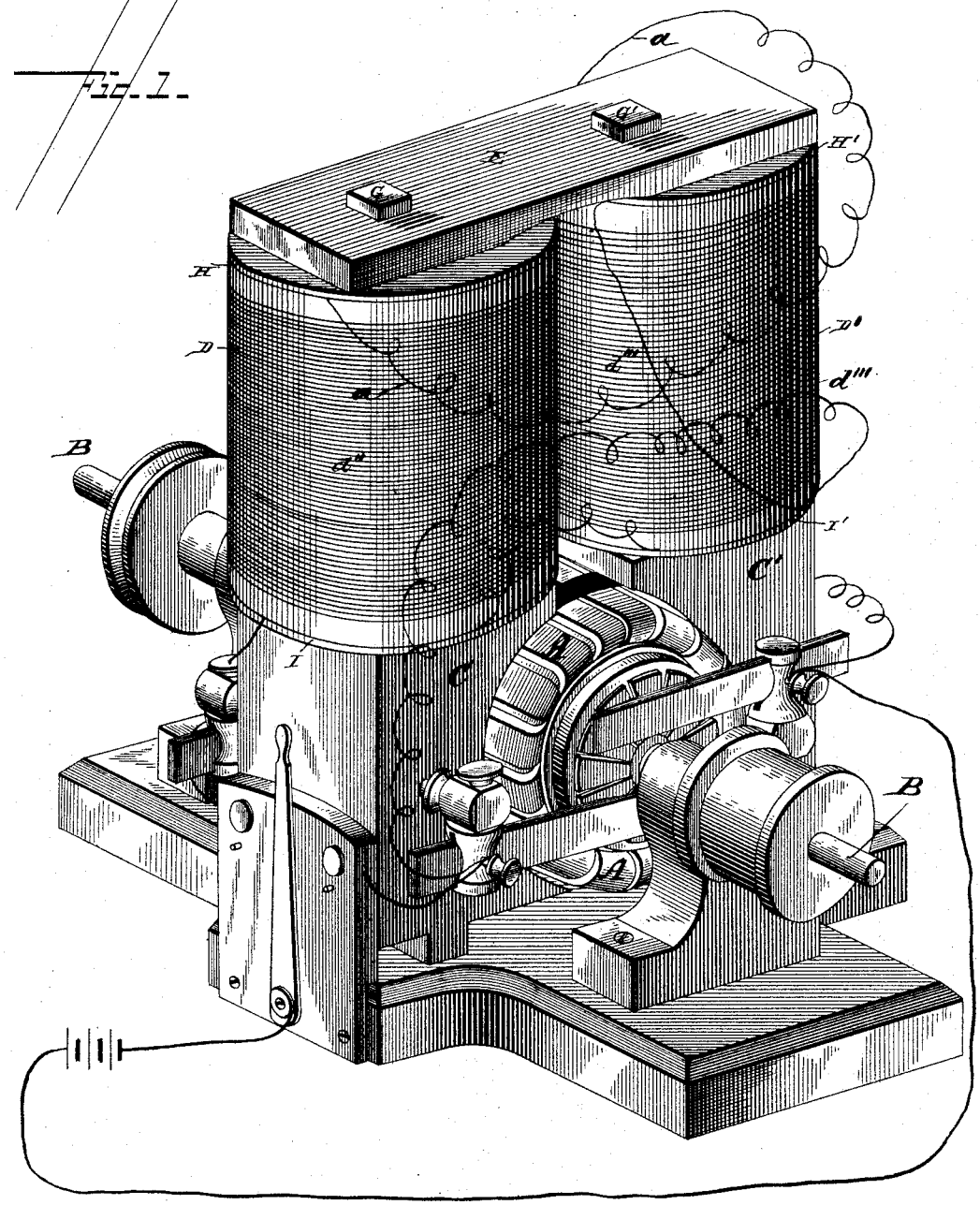
Figure 2:
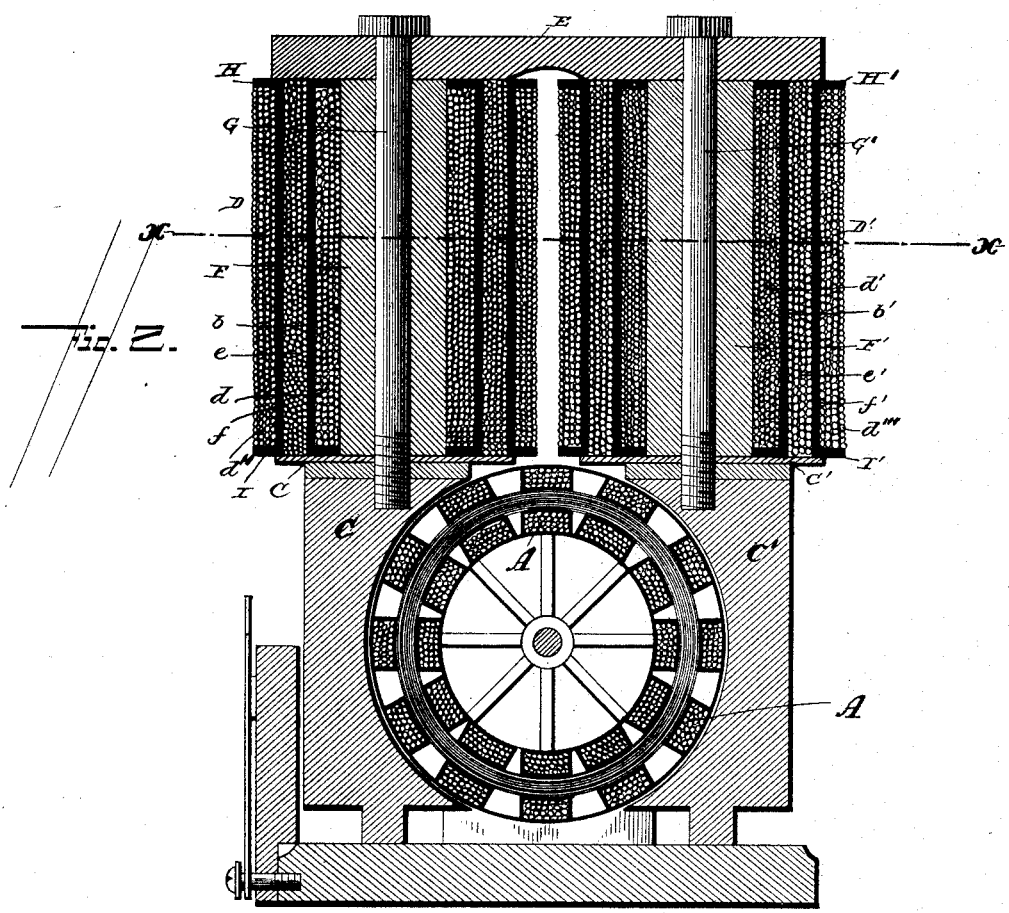
Figure 3:
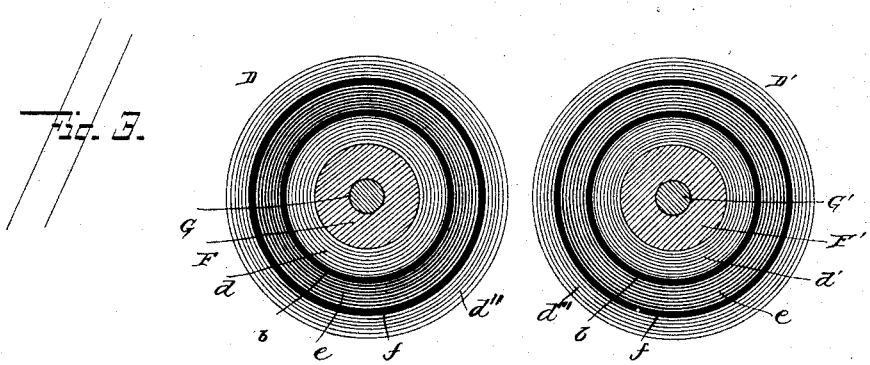

In the accompanying drawings, Figure 1 is a perspective view of an electric motor constructed according to my invention. Fig. 2 is a longitudinal vertical view on a vertical plane through the axis of the field-magnets; and Fig. 3 is a transverse sectional view through the field-magnets on the horizontal plane indicated by the line $x$ $x$, Fig. 1.

In the said drawings, the reference-letter A designates the armature; B, its shaft; C C', the pole-pieces; D D', the field-magnets, and E the yoke connecting the cores of said magnets. These field-magnets are exact duplicates of each other and are constructed as follows: I first take the cylindrical cores F F', having axial bores or apertures for the reception of the bolts G G', by which they are connected, respectively, at opposite ends to the yoke-plate E, and the pole-pieces C C'. Next I wind each of these cores F F' with wires $d$ and $d'$, the windings being in opposite directions—that is to say, one is wound from right to left, while the other is wound from left to right. After a proper thickness has been attained for the inner or "primary field," as I term it, I cover each magnet thus formed with a coating or jacket $b$ $b'$ of suitable insulating material. The next step is to form secondary cores $e$ $e'$ of coiled wire or soft iron of proper thickness around the cylindrical body of these insulated inner magnets, which in turn are covered by layers or jackets of insulating material $f f'$. The magnets are now completed by winding said wires $d''$ $d'''$, but in opposite directions to the windings of the inner coils, and then electrically connecting the inner coil terminals with each other and magnetically connecting all the cores by the yoke E.

From the above description it will be seen that the convolutions of the "primary" coil of each magnet run in a reverse or opposite direction to the convolution of the outer or "secondary" coil thereof, the inner ends of said wires being united or connected together while the outer ends constituting the terminal of the secondary coils are to be connected with battery, and when thus connected the circuit will be from battery through outer or secondary coil of one magnet, thus in a reverse or opposite direction through the inner or primary coil thereof, then over to inner coil of other magnet, and from there in a reverse or opposite direction through outer or secondary coil of this magnet to battery. The manner of winding and connecting said coil may be varied, however, without departing from the principle of the invention, which consists, essentially, in having the primary and secondary coils of each field-magnet wound in reverse or opposite directions to each other. For instance, instead of using separate wire in building the magnet, a single wire may be used as follows: First wind the inner core of one magnet, then carry wire over and wind the other core, then form secondary cores, then carry wire from inner core last wound back to first magnet and wind around secondary core in opposite directions to first winding, then over to secondary core of other magnet, and similarly wind in reverse direction to the primary coil thereof.

Upon the tops of magnets D are placed insulating-disks H H', of vulcanite or other suitable material which separate them from the under side of the yoke-plate E, yet in such manner that there shall be magnetic contact or connection between the central cores F F' and the yoke and also between the secondary cores $e\ e'$ and the yoke. Similar disks I I' are placed between the under side of the magnets D D' and their respective pole-pieces C C'.

I have found by actual test that in an electric motor constructed according to my invention and arranged as above described a very large percentage of the motive power employed to actuate the motor may be developed into effective work and be utilized, the only appreciable loss being that due to friction. The direction of rotation can be changed almost instantaneously, and very great speed may be attained.

It may be stated that the inner coils of each magnet should be many more turns than the outer or secondary coils.

Having thus described my invention, what I claim is—

1. The herein-described magnet for electric motors, consisting of a yoke and electrically and magnetically connected field-magnet cores, each composed of primary and secondary cores reversely wound with conducting-wires, substantially as specified.

2. The herein-described magnet for electric motors, consisting of two cores, each wound with a wire forming a primary magnetic field, a secondary core around each of said primary coils and insulated therefrom, and the wires of said primary coil wound in a reverse or opposite direction around said secondary cores and united with each other, and the said cores magnetically connected, substantially as described.

3. In an electric motor, the combination, with an armature, pole-pieces, commutators, and connections, of a field-magnet consisting of two cores, each wound with a wire forming primary coils, a secondary core around said primary coils and insulated therefrom, and the wires of each primary coil wound in a reverse or opposite direction upon the secondary core and united electrically with each other, and the said cores magnetically connected, substantially as described.

In testimony that I claim the foregoing as my own I have hereunto affixed my signature in presence of two witnesses.

HENRY GROSWITH.

Witnesses:
R. F. RANKIN,
ROY MEZGER.